UNITED STATES PATENT OFFICE.

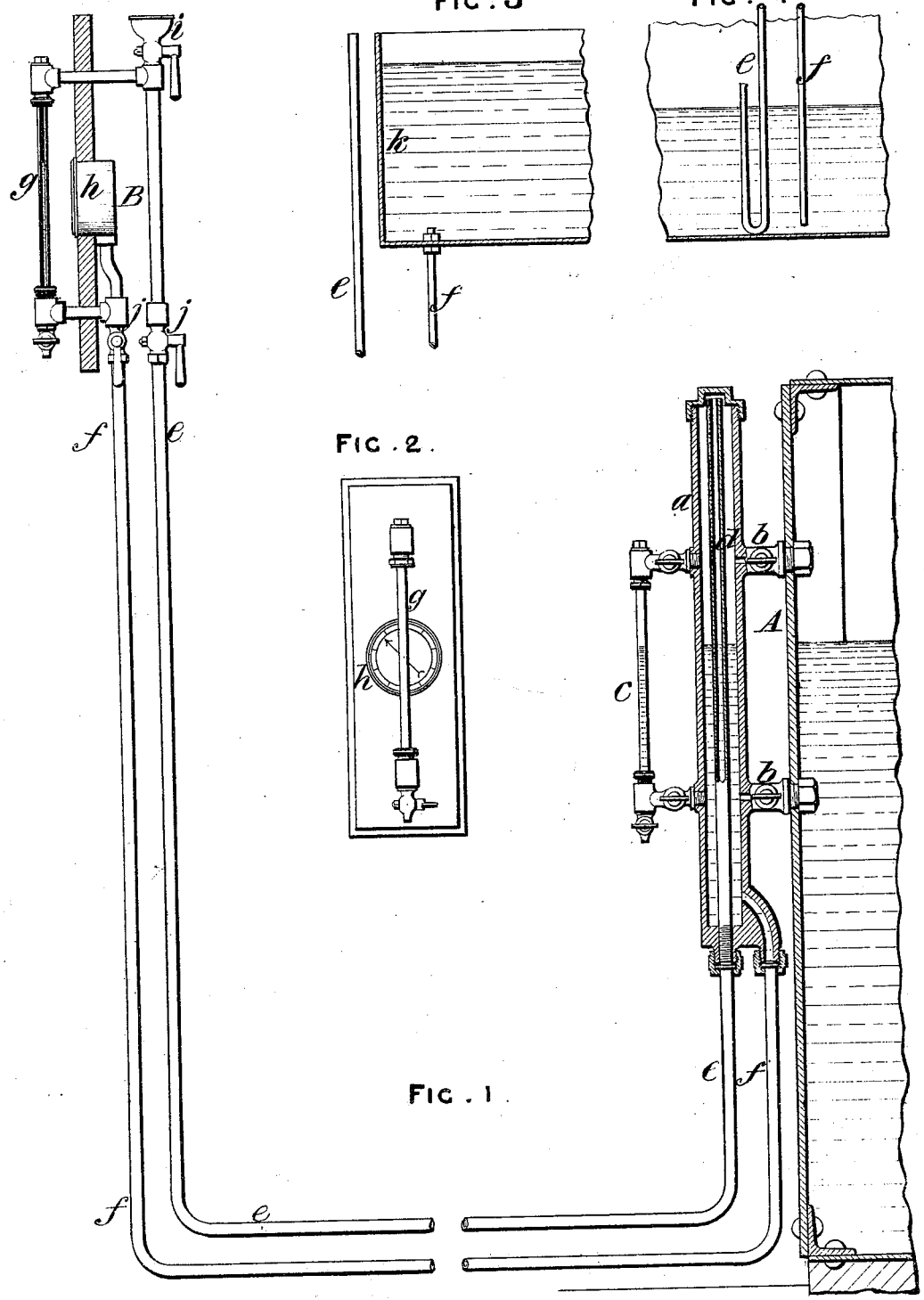

JOHN NICHOLAS, OF MANCHESTER, ENGLAND.

IMPROVEMENT IN WATER-GAGES.

Specification forming part of Letters Patent No. 177,269, dated May 9, 1876; application filed November 19, 1875.

*To all whom it may concern:*

Be it known that I, JOHN NICHOLAS, of Manchester, England, have invented certain Improvements in Apparatus for Indicating the Levels of Water or Liquid in Reservoirs, Ships' Holds, Steam-Generators, and other Places, of which the following is a specification:

This invention relates to apparatus for indicating the level of the water in steam-generators and in ships' holds, or in reservoirs or tanks, or to be otherwise employed in indicating the levels of liquids; and has for its object to effect the indication at a distance from the generator or hold, or from the reservoir containing fluid. This purpose is accomplished by employing two columns of fluid contained in tubes or pipes, and extending from the boiler, well, reservoir, or place containing the fluid, the level of which is to be indicated to the indicating apparatus.

The said indicating apparatus consists of a glass gage in which the fluid-level is indicated by the line of separation of two fluids which have not an affinity for each other—as, for example, oil and water, one of the two being colored if considered to be advisable.

The invention will be better understood when reference is made to the accompanying drawings, wherein—

Figure 1 represents the apparatus as applied to a steam-boiler. Fig. 2 is a front view of the indicating apparatus. Fig. 3 illustrates the application to a cistern above the indicating apparatus, and Fig. 4 to a reservoir below the indicating apparatus.

In Fig. 1, A is part of a steam-boiler, and B is the indicating apparatus, which may be at any reasonable distance from the boiler, and either above or below the same—as, for example, it may be in the office of the works. To the shell of the boiler is attached a cylindrical chamber, $a$, which is connected, by the cocks $b\,b$, with the boiler, so that the water will always remain at the same level within the said chamber as in the boiler. In the example the chamber is provided with an ordinary glass water-gage, $c$. The said chamber is provided with a central tube, $d$, which is connected with the piping $e$, which contains a column of fluid, and the lower end of the chamber is connected with the piping $f$, which contains a second column of fluid. The piping $e$ is connected with the upper end of the gage $g$, and the piping $f$ with the lower end thereof. The said gage is or may be similar to an ordinary glass water-gage. The piping $f$ is also connected with a pressure-gage, $h$, of any suitable construction; or the said pressure-gage may be dispensed with, if not required. The piping $e$ and $f$ and the glass gage are filled with fluid, and the tube $d$ is filled with fluid to the level of water in the boiler. The upper end of the piping $e$ is provided with a cock and cup, $i$, by means of which fluid lighter than water—as, for example, colored linseed or other oil—is introduced. The said oil is represented by the black upper portion of the glass tube of the gage.

The line of separation of the oil and water represents the level of the water in the boiler, and the apparatus is or may be so adjusted as that the said line shall coincide with the water-level in the gage C. To facilitate the adjustment pet-cocks (not seen in the drawing) may be fitted to the piping above the cocks $j\,j$.

As the level of water in the boiler and in the chamber $a$ rises and falls, the level in the tube $d$ also rises and falls; but as the water in the said tube can neither rise nor fall without setting in motion the fluid in the two ranges of piping $e$ and $f$ and in the glass gage $g$, it follows that the line of separation of the oil and water will rise or fall to a corresponding degree, and will thus at all times indicate the level of the water in the boiler.

By employing a siphon between the piping $f$ and the lower end of the gage $g$ a fluid heavier than water may be employed to indicate the level.

What is claimed as new is—

1. The combination of the chamber $a$, communicating with the steam and water spaces of the boiler, with the pipes $d$, $e$, and $f$, and the connecting-gage $g$, as and for the purpose set forth.

2. The combination of the pipes $e$ and $f$, glass gage $g$, and pressure-gage $h$.

3. The combination of the pipes $e$ and $f$ and gage $g$ with the valved cup $i$.

JOHN NICHOLAS.

Witnesses:
EDWARD K. DUTTON,
HUGH G. GRANT.